US006262182B1

(12) United States Patent
Eagan et al.

(10) Patent No.: US 6,262,182 B1
(45) Date of Patent: Jul. 17, 2001

(54) SOLUTION MODIFICATION OF POLYOLEFINS

(75) Inventors: Robert Lee Eagan, Batesville, AR (US); Lisa Kay Templeton, Kingsport, TN (US)

(73) Assignee: Eastman Chemical Co., Ltd., Kingsport, TN (US)

( * ) Notice: Subject to any disclaimer, the term of this patent is extended or adjusted under 35 U.S.C. 154(b) by 0 days.

(21) Appl. No.: 09/453,892

(22) Filed: Mar. 14, 2000

Related U.S. Application Data

(60) Provisional application No. 60/138,230, filed on Jun. 9, 1999.

(51) Int. Cl.$^7$ .......................... C08F 255/00; C08F 110/06
(52) U.S. Cl. .......................... 525/285; 525/297; 525/263; 525/273; 526/351; 526/331
(58) Field of Search .................................. 525/285, 297, 525/263, 273; 526/351, 331

(56) References Cited

U.S. PATENT DOCUMENTS 4,299,754  11/1981  Shiomi et al. .
4,624,992  11/1986  Milani et al. .

FOREIGN PATENT DOCUMENTS 59-8282  2/1984  (JP) .
7-68502  7/1995  (JP) .

OTHER PUBLICATIONS

Solvent Influence on the Radical Grafting of Maleic Anhydride on Low Density Polyethylene, A. Priola et al., Eur. Poly. J. vol. 30, No. 9, pp. 1047–1050, 1994.

*Primary Examiner*—Rabon Sergent
*Assistant Examiner*—Olga Asinovsky
(74) *Attorney, Agent, or Firm*—Bernard J. Graves; Rose M. Allen

(57) ABSTRACT

The invention enables solution modification of a polyolefin with an unsaturated anhydride, unsaturated acid, or unsaturated ester, with high efficiency without the formation of undesirable impurities resulting from the competing reaction of the solvent with the unsaturated anhydride, unsaturated acid, or unsaturated ester. The process entails combining a polyolefin; a solvent; an unsaturated anhydride, unsaturated acid or unsaturated ester and a free-radical initiator to form a reaction mixture. The solvent is selected from the group consisting of substituted aromatic solvents which do not contain benzylic hydrogens and mixtures thereof. This reaction mixture is reacted under suitable conditions to produce a modified polyolefin.

21 Claims, No Drawings

SOLUTION MODIFICATION OF POLYOLEFINS

CROSS-REFERENCE TO RELATED APPLICATIONS

Continuity Data

This application is a non-provisional of provisional application No. 60/138,230 of Jun. 9, 1999 now pending, incorporated by reference herein in its entirety.;

STATEMENT REGARDING FEDERALLY SPONSORED RESEARCH

Not Applicable

REFERENCE TO A MICROFICHE APPENDIX

Not Applicable

1. Field of the Invention

This invention relates to a process for the modification of a polyolefin with an unsaturated anhydride, unsaturated acid, or unsaturated ester in the presence of a radical initiator in a suitable organic solvent. By choosing the appropriate solvent, modification of the polyolefin can be achieved with high efficiency without the formation of undesirable impurities resulting from the competing reaction of the solvent with the unsaturated anhydride, unsaturated acid, or unsaturated ester. Polyolefins modified by this process are useful as adhesion promoters for the application of paints and other coatings to substrates derived from polyolefins, such as polypropylene, thermoplastic olefin and polyethylene.

2. Background of the Invention

The modification of polyolefins by reaction with maleic anhydride and other unsaturated anhydrides, acids, and esters is well known in the polymer art. The process typically involves the reaction of an unsaturated anhydride, unsaturated acid, or unsaturated ester with a polyolefin in the presence of a radical initiator. The radical initiator is typically an organic peroxide or azo compound. The choice of initiator used in the reaction is generally dictated by the selection of the desired processing temperature. The reaction can either be carried out in solution or in the molten state.

The choice of solvent for this reaction is somewhat limited due to solubility constraints of the polyolefin. Polyolefins derived from ethylene and propylene are most soluble in aromatic solvents and chlorinated solvents, and partially soluble in selected aliphatic solvents. Chlorinated solvents are not the solvents of choice for this reaction due to toxicity and environmental issues. Consequently, toluene and xylene are typically used as the reaction solvent. These solvents are readily available and relatively inexpensive. In addition, these solvents possess relatively low boiling points that allow for their efficient removal via distillation at reduced pressure following the reaction, should that be desired.

U.S. Pat. No. 4,299,754 discloses a process for preparing a surface treating agent which comprises dissolving a propylene-ethylene copolymer having a propylene content of 50–75 mole % and a crystallinity determined by an X-ray diffraction method of 2 to 20% in an organic solvent and graft polymerizing it with maleic acid or maleic anhydride in the presence of a radical generator to provide an organic solvent solution of the modified copolymer having a concentration of 10 to 100 kg per cubic meter of the solvent. Examples of the organic solvent which are disclosed include aromatic hydrocarbons such as benzene, toluene and xylene, aliphatic hydrocarbons such as hexane, heptane, octane, and decane and chlorinated hydrocarbons.

Japanese patent 59-8282 describes a melt polymerization method for making a modified polyolefin having improved strength and flowability. However, this patent discloses that the polyolefin must have an ethylene content of no less than 50 mole % in order to obtain a modified polyolefin having improved strength. The polyolefin is kneaded at a temperature of 160 degrees C. in the presence of an unsaturated carboxylic acid or its anhydride and an aromatic hydrocarbon having a tertiary alkyl group or a secondary alkyl group or an aromatic hydrocarbon having no less than three primary alkyl groups. The aromatic hydrocarbon is present in an amount of 0.5 to 30 wt. parts per 100 wt. parts of polyolefin.

Japanese patent 2,049,578 describes a method of preparing an adhesive composition comprising subjecting a polyolefin-based resin dissolved in an organic solvent to graft polymerization using substantially equimolar amounts of maleic anhydride or maleic acid and a styrene-based monomer in the presence of a radical generating agent to obtain a graft resin solution. Micro-particles of the graft resin are then precipitated from the solution. Among the suitable organic solvents listed are benzene, toluene, xylene and "other alkyl benzenes." In all examples xylene is used as the solvent.

The typical aromatic solvents used to modify polyolefins by reaction with maleic anhydride are inherently reactive under the reaction conditions. Both toluene and xylene contain benzylic hydrogens that are easily abstracted by free radicals produced from the decomposition of the radical initiator used in the reaction. The resulting benzylic radical can then react with the unsaturated anhydride, unsaturated acid, or unsaturated ester to generate an undesirable impurity in the reaction. For example, one possible reaction sequence is illustrated by the reaction of xylene with maleic anhydride to produce a maleated xylene compound.

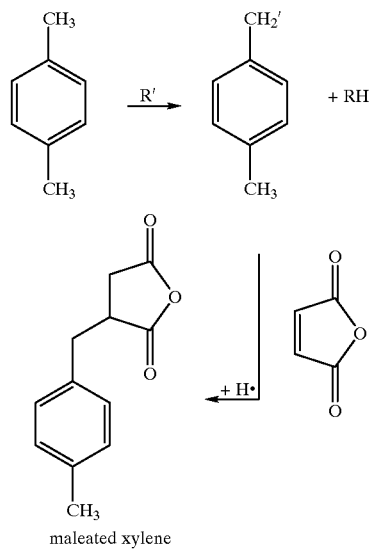

maleated xylene

Competition between the solvent and the polyolefin with respect to the reaction with the unsaturated anhydride, unsaturated acid, or unsaturated ester results in an overall lower yield for the desired reaction and the generation of undesirable impurities that may need to be removed from the reaction mixture.

Impurities resulting from the reaction of maleic anhydride with solvent are typically removed by precipitating the modified polyolefin from solution through the addition of an anti-solvent, e.g., acetone. The impurities are soluble in the anti-solvent whereas the modified polyolefin is not. As a consequence of the purification step, additional time, waste, and process costs are generated in the process.

It has been reported that the radical grafting of maleic anhydride on low-density polyethylene is strongly dependent on the kind of solvent used. (Eur. Polym. J., Vol. 30, No. 9, pp. 1047–1050, 1994). This article discloses that if benzylic hydrogens are present in the solvent molecule, they take part in the reaction with maleic anhydride. For instance, when p-xylene was used as the solvent to graft maleic anhydride to low density polyethylene, only 10% of the maleic anhydride reacted with the polyolefin while the remainder reacted with the solvent. However, when solvents free of benzylic hydrogens, such as t-butylbenzene and o-dichlorobenzene were used, maleic anhydride conversion was low but nearly all was bound to the polymer. Running the reaction under more forcing conditions (i.e., higher concentrations of maleic anhydride and initiator, longer reaction times) did not increase the grafting efficiency but rather it resulted in intermolecular coupling (i.e., crosslinking) with the formation of a gelled polymer.

It would be highly desirable to modify a polyolefin with an unsaturated anhydride, unsaturated acid or unsaturated ester in a reaction solvent which is not environmentally toxic and does not compete with the polyolefin, while still achieving a high grafting efficiency. Fewer impurities would be generated and the purification step could possibly be avoided.

SUMMARY OF THE INVENTION

It has been discovered that polyolefins may be modified in solution with an unsaturated anhydride, unsaturated acid, or unsaturated ester, with high grafting efficiency without the formation of undesirable impurities resulting from the competing reaction of the solvent with the unsaturated anhydride, unsaturated acid, or unsaturated ester.

Accordingly, the invention provides an improved process for the solution modification of polyolefins. The process entails dissolving a polyolefin selected from the group consisting of polypropylene and a copolymer comprised of propylene and up to but not including 50 mole percent of a co-monomer, in a solvent to form a solution. An unsaturated anhydride, unsaturated acid or unsaturated ester and a free-radical initiator are then added to the solution to form a reaction mixture. The solvent used to dissolve the polyolefin is a substituted aromatic solvent which does not contain benzylic hydrogens or a mixture of such solvents. The reaction mixture is reacted under suitable conditions to produce a modified polyolefin.

BRIEF DESCRIPTION OF THE SEVERAL VIEWS OF THE DRAWINGS

Not Applicable

DETAILED DESCRIPTION OF THE INVENTION

The invention relates to a process for modifying a polyolefin comprising dissolving a polyolefin selected from the group consisting of polypropylene and a copolymer comprised of propylene and up to but not including 50 mole percent of a co-monomer, in a solvent to form a solution. An unsaturated anhydride, unsaturated acid or unsaturated ester and a free-radical initiator are then added to the solution to form a reaction mixture. The reaction mixture is reacted under suitable conditions to produce a modified polyolefin. The process of the invention employs a solvent which is a substituted aromatic solvent that does not contain benzylic hydrogens, or a mixture of such solvents.

As discussed above, solvents which may be used in the process of the invention include substituted aromatic solvents which do not contain benzylic hydrogens or a mixture of such solvents. Solvents may be determined to be suitable or not suitable for this process by measuring the acid number of a sample of "purified polyolefin" after grafting. An acid number is defined as the number of milligrams of KOH which is required to neutralize one gram of sample. To determine acid numbers, polyolefins are purified by precipitating the modified polyolefin from solution through the addition of an anti-solvent, i.e., one in which the modified polyolefin is not appreciably soluble, such as acetone. Unreacted anhydride, acid, or ester and impurities resulting from the reaction of anhydride, acid, or ester with the solvent, should be soluble in the anti-solvent such that they can be conveniently removed by decanting the anti-solvent solution away from the precipitated polymer. The purified polymer may then be dried to constant weight in a vacuum oven. Minor amounts of modified polyolefin may be lost in this process resulting in a slight decrease in the anticipated acid number of the modified polyolefin.

Measuring the acid number of the purified polymer gives an indication of the extent of reaction. For a given charge of maleic anhydride, the higher the acid number, the greater the level of anhydride or acid bound to the polyolefin and thus, the more efficient the reaction. For instance, if 8 weight % maleic anhydride based on the amount of polyolefin is used, the modified polyolefin preferably has an acid number of at least about 30 mg KOH/gram of the purified modified polyolefin. More preferably the acid number is at least about 44 mg KOH/gram of the purified modified polyolefin.

Examples of substituted aromatic solvents that do not contain benzylic hydrogens include, but are not limited to, tert-butylbenzene, anisole, biphenyl, diphenyl ether, methyl benzoate and mixtures thereof. The most preferred solvents are anisole and tert-butylbenzene as they are liquids at ambient temperatures and have relatively low boiling points.

Diisopropyl benzene, described in Japanese patent 59-8282, as an example of an acceptable solvent for modifying a polyolefin, is not suitable for use in the present invention as this solvent results in a poor conversion of maleic anhydride to maleated polyolefin as shown by the relatively low acid number of the modified polyolefin (See Table 1 below and comparative Example #3). Also not suitable as the solvent in the invention are benzene, toluene and xylene, which are mentioned as suitable solvents in Japanese patent 2,049,578. Toluene and xylene also result in low conversion of maleic anhydride to maleated polyolefin (see Table I below). Benzene is not suitable from a toxicity and environmental standpoint.

Table 1 below summarizes the acid numbers of ethylene-propylene copolymers comprised of about 80 mole percent propylene and 20 mole percent ethylene modified with maleic anhydride using various solvents.

TABLE t1

| Solvent | Maleic Anhydride Level* | Peroxide | Peroxide Level* | Reaction Temp | Reaction Time | Purified Acid No. (mg KOH/g modified polyolefin) |
|---|---|---|---|---|---|---|
| Toluene | 8.0% | t-butyl-peroxy isopropyl-carbonate | 5.2% | 110 degrees C. | 3 Hrs | 24.3 (comparative) |
| Xylene | 8.0% | 2,5-bis(t-butyl-peroxy)-2,5-dimethyl-hexane | 3.2% | 135 degrees C. | 4 Hrs | |
| m-Diisopropyl | 8.0% | 2,5-bis(t-butyl-peroxy)-2,5-dimethyl-hexane | 3.2% | 190 degrees C. | 4 Hrs | 11.6 (comparative) |
| p-Diisopropyl-benzene | 8.0% | 2,5-bis(t-butyl-peroxy)-2,5-dimethyl-hexane | 3.2% | 190 degrees C. | 4 Hrs | 12.3 (comparative) |
| t-Butyl benzene zene | 8.0% | 2,5-bis(t-butyl-peroxy)-2,5-dimethyl-hexane | 3.2% | 165 degrees C. | 4 Hrs | 45.8 |
| Anisole | 8.0% | 2,5-bis(t-butyl-peroxy)-2,5-dimethyl-hexane | 3.2% | 150 degrees C. | 4 Hrs | 44.6 |
| Decane | 8.0% | 2,5-bis(t-butyl-peroxy)-2,5-dimethyl-hexane | 3.2% | 170 degrees C. | 4 Hrs | 21.9 (comparative) |
| Biphenyl | 8.0% | 2,5-bis(t-butyl-peroxy)-2,5-dimethyl-hexane | 3.2% | 170 degrees C. | 4 Hrs | 37.9 |
| Diphenyl ether | 8.0% | 2,5-bis(t-butyl-peroxy)-2,5-dimethyl-hexane | 3.2% | 170 degrees C. | 4 Hrs | 41.0 |
| Methyl benzoate | 8.0% | 2,5-bis(t-butyl-peroxy)-2,5-dimethyl-hexane | 3.2% | 170 degrees C. | 4 Hrs | 38.2 |

*The level of maleic anhydride and peroxide charged is based on the weight of polyolefin.

Several of the reactions summarized in Table 1 were analyzed by gas chromatography—mass spectrometry (GC-MS) to determine if impurities resulting from the reaction of solvent with maleic anhydride were present. Compounds were detected by mass spectrometry that had molecular weights consistent with a maleated toluene structure, a maleated xylene structure, and a maleated diisopropylbenzene structure. This showed the presence of impurities from the reaction of the solvent with the maleic anhydride. GC-MS analysis of reactions run in tert-butylbenzene structure and anisole detected only trace levels of compounds consistent with a maleated tert-butylbenzene structure or maleated anisole structure, substantiating that these solvents do not participate in the reaction.

Thus reactions run in toluene, xylenes, m- and p-diisopropylbenzene, and decane produced impurities resulting from the reaction of maleic anhydride with each of these solvents. Although decane does not contain benzylic hydrogens, secondary hydrogens are present in this compound that react in a similar manner. When m- and p-diisopropylbenzene were used as the solvent, the majority of the reaction took place between the solvent and the maleic anhydride.

The amount of solvent used in this invention should be enough to form a solution of the polyolefin and the unsaturated anhydride, unsaturated acid, or unsaturated ester at the desired operating temperature. Too little solvent may result in a modified polyolefin that is not homogeneous throughout or may possibly give rise to a cross-linked polyolefin, which exhibits poor solubility in various solvents or may even gel. Too much solvent should be avoided so as not to limit throughput in the process. Suitable amounts of solvent for carrying out the reaction range from about 50 to about 400 weight percent based on the weight of polyolefin present. A more preferable range is from about 50 to about 200 weight percent.

Suitable polyolefins for use in this invention include polypropylene or any copolymer comprised of propylene and up to but not including 50 mole percent of a co-monomer. Preferred co-monomers include alpha olefins containing 2–10 carbon atoms. For example, copolymers of propylene and ethylene, propylene and 1-butene, and propylene and 1-hexene are particularly preferred for this process. In addition, mixtures of the previously mentioned polyolefins may be used in this process as opposed to using a single polyolefin. A preferred copolymer is an ethylene-propylene copolymer comprised of about 80 mole percent propylene and about 20 mole percent ethylene.

Suitable unsaturated anhydrides, unsaturated acids, or unsaturated esters for practice of the present invention include, but are not limited to, maleic anhydride, citraconic anhydride, itaconic anhydride, glutaconic anhydride, 2,3-dimethylmaleic anhydride; maleic acid, fumaric acid, citraconic acid, itaconic acid, mesaconic acid, glutaconic acid, acrylic acid, methacrylic acid, crotonic acid, 2-pentenoic acid, 2-methyl-2-pentenoic acid; dimethyl maleate, diethyl maleate, di-n-propyl maleate, diisopropyl maleate, dimethyl fumarate, diethyl fumarate, di-n-propyl fumarate, di-isopropyl maleate, dimethyl itaconate, methyl acrylate, ethyl acrylate, methyl methacrylate, ethyl methacrylate, methyl crotonate, and ethyl crotonate. Preferably, the concentration of the unsaturated anhydride, unsaturated acid or unsaturated ester is in the range of from about 1 to about 20 weight percent based on the weight of polyolefin. A more preferable range is from about 2 to about 12 weight percent. A range of about 6 to about 12 weight percent is most preferred Suitable radical initiators are typically organic peroxides or azo compounds. According to literature from Laporte Organics, a supplier of numerous organic peroxides, the half-life of the initiator at a given reaction temperature should be approximately one-third to one-sixth of the reaction time. By knowing the half-life of the initiator at a specific temperature, a suitable reaction time can be quickly determined. The more stable the initiator, the longer the reaction time. For example, a peroxide may be suitable if its half-life at a given reaction temperature is 10 hours or less. Examples of organic peroxide compounds which may be used include, but are not limited to, dibenzoyl peroxide, tert-amylperoxy 2-ethylhexanoate, tert-butylperoxy 2-ethylhexanoate, tert-butylperoxy isobutyrate, tert-butylperoxy isopropyl carbonate, tert-butylperoxy 3,5,5-trimethylhexanoate, 2,5-dimethyl-2,5-di(benzolyperoxy)

hexane, tert-butylperoxy acetate, tert-butylperoxy benzoate, n-butyl 4,4-di(tert-butylperoxy)valerate, dicumyl peroxide, tert-butylcumyl peroxide, di(2-tert-butylperoxy isopropyl) benzene, 2,5-dimethyl-2,5-di (tert-butylperoxy)hexane, di(tert-butyl)peroxide, 2,5-dimethyl-2,5-di(tert-butylperoxy)-3-hexyne, tert-butyl hydroperoxide, cumyl hydroperoxide and mixtures thereof. Examples of suitable azo compounds include, but are not limited to, 2,2'-azobisisopropionitirile, 2,2'-azobisisobutyronitrile (AIBN), dimethyl azoisobutyrate, 1,1'-azobis (cyclohexanecarbonitrile), 2,2'-azobis(2-methylpropane) and mixtures thereof. Typical concentrations of radical initiators range from about 0.1 to about 20 weight percent, based on the weight of the polyolefin. A more preferable range is from about 0.2 to about 10 weight percent.

The addition of unsaturated anhydrides, unsaturated acids, or unsaturated esters and a radical initiator can be carried out under numerous scenarios. The unsaturated anhydride, unsaturated acid, or unsaturated ester can be added before the radical initiator, concurrent with the radical initiator, or subsequent to the addition of the radical initiator. The unsaturated anhydride, unsaturated acid, or unsaturated ester can be added either in a molten state or as a solution in a solvent that does not interfere with the reaction. Likewise, the radical initiator can be added to the reaction in either solid form or liquid form. It is also possible to charge a solution of the unsaturated anhydride, unsaturated acid, or unsaturated ester containing the radical initiator provided the solvent does not interfere with the desired reaction. The solvent used to dissolve the unsaturated anhydride, unsaturated acid, or unsaturated ester and/or the radical initiator can be the same or different from the reaction solvent. Preferably the solvent has a low volatility such that it flashes off and does not contaminate the reaction solvent. The preferred solvents for dissolving the unsaturated anhydride, unsaturated acid, or unsaturated ester include ketone solvents such as acetone and methyl ethyl ketone. For example, maleic anhydride is very soluble in these two solvents but the polyolefin is not. In general, ketone solvents, i.e., acetone, and methyl ethyl ketone may be used in amounts which do not cause the polyolefin to precipitate.

The process of the invention is typically carried out in solution at temperatures ranging from about 100 degrees C. to about 260 degrees C., depending on the choice of solvent. The reaction may be carried out at temperatures up to and including the boiling point of the solvent. A more preferable temperature range is from about 120 degrees C. to about 240 degrees C.; and a most preferred temperature range is from about 130 degrees C. to about 220 degrees C.

Following the completion of the reaction, the total reaction product may be used as is, or optionally the solvent used in the reaction may be removed via distillation at either ambient pressure or more preferably at reduced pressure. As a way of reducing cost in the process the solvent may be recovered and recycled in subsequent batches. Solvents with relatively low boiling points are typically easier to remove and consequently more desirable for use in this process. tert-Butylbenzene, which has a boiling point of 169 degrees C. and anisole which has a boiling point of 154 degrees C., are preferred solvents for this process due to their lack of reactivity and case of removal.

Once the reaction solvent has been removed, the modified polyolefin may either be packaged in the molten state or redissolved in a more desirable solvent for distribution. Any solvent in which the modified polyolefin is reasonably soluble may be used. Suitable solvents for the dissolution of the modified polyolefin include aromatic hydrocarbon solvents, such as, toluene, xylene, Aromatic 100 (available from Exxon Chemical Company), chlorinated solvents, aliphatic hydrocarbon solvents, such as, Varnish Makers and Painters naphtha (i.e., VM&P naphtha), mineral spirits, Lacolene® solvents (available from Ashland Chemical Company of Ohio), ester solvents, such as, propyl acetate, and butyl acetate and ketone solvents, such as, methyl amyl ketone (MAK).

This invention can be further illustrated by the following examples of preferred embodiments thereof, although it will be understood that these examples are included merely for purposes of illustration and are not intended to limit the scope of the invention unless otherwise specifically indicated.

EXAMPLES

Example #1

To a 1-L, 3-neck round bottom flask equipped with a mechanical overhead stirrer, condenser, two addition funnels, and a nitrogen inlet was charged 200 grams of tert-butylbenzene and 151.2 grams of an ethylene-propylene copolymer comprised of about 80 mole percent propylene and about 20 mole percent ethylene. The mixture was heated to 165 degrees C. over 1 hour to obtain a colorless solution. While holding at 165 degrees C. for 30 minutes, maleic anhydride (12.0 grams) was charged to one of the addition funnels and 2,5-bis(tert-butylpcroxy)-2,5-dimethylhexane (4.8 grams, radical initiator) was charged to the other addition funnel. The addition funnel containing the maleic anhydride was heated using a hot air gun to melt the maleic anhydride. The molten maleic anhydride and radical initiator were charged concurrently to the reaction flask over 30–35 minutes. The contents of the flask were stirred for an additional 4 hours at 165 degrees C. following the addition of the maleic anhydride and the radical initiator. A portion of the reaction mixture (75.4 grams) was charged to another 1-L, 3-neck flask and the temperature was adjusted to 65 degrees C. Acetone (225 grams) was charged to the flask over 30 minutes to precipitate the modified polyolefin out of solution while keeping the temperature between 63–65 degrees C. The resulting mixture was refluxed for 30 minutes then cooled to 56 degrees C. The acetone was decanted away from the precipitated polymer. Additional acetone (225 grams) was charged to the flask and the mixture was heated to reflux and held for 30 minutes. The mixture was cooled slightly and the acetone was decanted away from the polymer. The polymer was dried in an 80 degrees C. vacuum oven overnight. Analysis yielded an acid number value of 45.8 mg KOH/gram for the purified modified polyolefin.

Example #2

To a 1-L, 3-neck round bottom flask equipped with a mechanical overhead stirrer, condenser, two addition funnels, and a nitrogen inlet was charged 200 grams of anisole and 150.1 grams of an ethylene-propylene copolymer comprised of about 80 mole percent propylene and about 20 mole percent ethylene. The mixture was heated to 150 degrees C. over 1 hour to afford a solution. During the heat-up period, maleic anhydride (12.0 grams) was dissolved in anisole (80 ml) and charged to an addition funnel. Dicumyl peroxide (8.3 grams) was dissolved in anisole (40 ml) and charged to the other addition funnel. The maleic anhydride/anisole solution and the peroxide/anisole solution were charged concurrently to the reaction flask over 1 hour at 140–151 degrees C. Following the addition, the reaction mixture was held at 150 degrees C. for 5 hours. A portion of the reaction mixture (76.1 grams) was charged to another 1-L, 3-neck flask and the temperature was adjusted to 60–65 degrees C. Acetone (225 grams) was charged to the flask over 20 minutes to precipitate the modified polyolefin out of solution while keeping the temperature between 60–65 degrees C. The resulting mixture was refluxed for 45 minutes then cooled to about 50 degrees C. The acetone was decanted away from the precipitated polymer. Additional acetone (225 grams) was charged to the flask and the mixture was heated to reflux and held for 30 minutes. The mixture was cooled slightly and the acetone was decanted away from the polymer. The polymer was dried in an 80 degrees C. vacuum oven overnight. Analysis yielded an acid number value of 36.6 mg KOI I/gram for the purified modified polyolefin.

Example #3
(Comparative example)

To a 1-L, 3-neck round bottom flask equipped with a mechanical overhead stirrer, condenser, addition funnel, and a nitrogen inlet was charged 200 grams of p-diisopropylbenzene and 150.3 grams of an ethylene-propylene copolymer comprised of about 80 mole percent propylene and about 20 mole percent ethylene. The mixture was heated to 190 degrees C. over 1 hour to afford a solution. Maleic anhydride (12.0 grams) was charged to the reaction flask. 2,5-bis(tert-butylperoxy)-2,5-dimethylhexane (4.8 grams, radical initiator) was charged to the addition funnel. The peroxide was charged dropwise to the reaction flask over 40 minutes at 187–191 degrees C. Following the addition, the reaction mixture was held at 189–190degrees C. for 4 hours. A portion of the reaction mixture (250 grams) was removed leaving about 115 grams in the flask. The temperature was adjusted to 60–65 degrees C. Acetone (250 grams) was charged to the flask over 20 minutes to precipitate the modified polyolefin out of solution while keeping the temperature between 60–65 degrees C. The resulting mixture was refluxed for 1 hour then cooled to about 40 degrees C. The acetone was decanted away from the precipitated polymer. Additional acetone (250 grams) was charged to the flask and the mixture was heated to reflux and held for 45 minutes. The mixture was cooled slightly and the acetone was decanted away from the polymer. The polymer was dried in an 80 degrees C. vacuum oven overnight. Analysis yielded an acid number value of 12.3 mg KOH/gram for the purified modified polyolefin. This is an example of a solvent that is not suitable for the present invention due to the formation of maleated impurities. Thus the modified polymer had a lower acid number.

Example #4

To a 1-L, 3-neck round bottom flask equipped with a mechanical overhead stirrer, condenser, two addition funnels, and a nitrogen inlet was charged 366 grams of tert-butylbenzene and 199.0 grams of an ethylene-propylene copolymer comprised of about 80 mole percent propylene and about 20 mole percent ethylene. The mixture was heated to 150 degrees C. over 1 hour to afford a colorless solution. While holding at 150 degrees C for 30 minutes, maleic anhydride (16.0 grams) was charged to one of the addition funnels and 2,5-bis(tert-butylperoxy)-2,5-dimethylhexane (6.4 grams, radical initiator) was charged to the other addition funnel. The addition funnel containing the maleic anhydride was heated using a hot air gun to melt the maleic anhydride. The molten maleic anhydride and radical initiator were charged concurrently to the reaction flask over 65 minutes. The contents of the flask were stirred for an additional 4 hours at 150 degrees C. following the addition of the maleic anhydride and the radical initiator. The tert-butylbenzene was distilled from the reaction mixture under vacuum until nothing else distilled from the pot at a temperature of 150 degrees C. and a pressure of 50 mmHg. The molten modified polymer was poured into a wax-coated box and allowed to cool. Analysis yielded an acid number value of 60.0 mg KOH/gram for the modified polyolefin.

Example #5

To a 1-L, 3-neck round bottom flask equipped with a mechanical overhead stirrer, condenser, addition funnel, and a nitrogen inlet was charged 199.0 grams of Vestoplast 828 (ethylene-propylene copolymer, ethylene content ~43 mole percent, available from HULS), maleic anhydride (16 grams), and anisole (366 grams). The mixture was heated to 150 degrees C. over 1 hour to afford a slightly yellow solution. While holding at 150 degrees C., 2,5-bis(tert-butylperoxy)-2,5-dimethylhexane (6.4 grams, radical initiator) was charged to the addition funnel. The radical initiator was charged dropwise to the reaction flask over 40 minutes. The contents of the flask were stirred for an additional 4 hours at 150 degrees C. following the addition of the radical initiator. The anisole was distilled from the reaction mixture under vacuum until nothing else distilled from the pot at a temperature of 150 degrees C. and a pressure of 50 mmHg. The molten modified polymer was poured into a wax-coated box and allowed to cool. Analysis yielded an acid number value of 58.8 mg KOH/gram for the modified polyolefin.

Example #6

To a 1-L, 3-neck round bottom flask equipped with a mechanical overhead stirrer, condenser, two addition funnels, and a nitrogen inlet was charged 275 grams of tert-butylbenzene and 150.0 grams of an ethylene-propylene copolymer comprised of about 80 mole percent propylene and about 20 mole percent ethylene. The mixture was heated to 150 degrees C. over 45 minutes to afford a colorless solution. While holding at 150 degrees C. for 30 minutes, maleic anhydride (12.0 grams) was charged to one of the addition funnels and 2,5-bis(tert-butylperoxy)-2,5-dimethylhexane (4.8 grams, radical initiator) was charged to the other addition funnel. The addition funnel containing the maleic anhydride was heated using a hot air gun to melt the maleic anhydride. The molten maleic anhydride and radical initiator were charged concurrently to the reaction flask over 40 minutes. The contents of the flask were stirred for an additional 4 hours at 150 degrees C following the addition of the maleic anhydride and the radical initiator. The tert-butylbenzene was distilled from the reaction mixture under vacuum until nothing else distilled from the pot at a temperature of 150 degrees C. and a pressure of 50 mmHg. Xylene (465 grams, mixed isomers) was charged to the molten modified polyolefin over 45 minutes while maintaining the temperature between 133–145 degrees C. The resulting solution of the modified polyolefin in xylene was cooled to room temperature and bottled. Analysis of this material yielded an acid number of 13.7 mg KOH/gram with a solids level of 25.3%. Correcting for %-solids, the acid number value increases to 54.2 mg KOH/gram for 100 percent solid material.

Example #7

To a 1-L, 3-neck round bottom flask equipped with a mechanical overhead stirrer, condenser, addition funnel, and a nitrogen inlet were charged 275 grams of tert-butylbenzene and 150.0 grams of polypropylene. The mixture was heated to 165 degrees C over 45 minutes to afford a slightly yellow solution. While holding at 165 degrees C., maleic anhydride (12.0 grams) was charged to the reaction flask and 2,5-bis(tert-butylperoxy)-2,5-dimethylhexane (4.8 grams, radical initiator) was charged to the addition funnel. The radical initiator was charged dropwise to the reaction flask over 1 hour at 165 degrees C. The contents of the flask were stirred for an additional 4 hours at 165 degrees C. following the addition of the radical initiator. The reaction mixture was transferred to a 2-L, 3-neck round bottom flask and the temperature of the reaction mixture was adjusted to 65 degrees C. Acetone (1.5 liters) was charged to the flask over 1 hour while maintaining the temperature at 59–65 degrees C. The resulting mixture was refluxed for 1 hour then cooled to room temperature. The solids were collected by filtration and were washed with acetone (150 ml). The acetone-wet material was dried to constant weight in a 60 degrees C. vacuum oven. This afforded 146 grams of an off-white solid. Analysis of this material yielded an acid number value of 3 1.7 mg KOH/gram for the purified modified polyolefin.

Example #8

To a 1-L, 3-neck round bottom flask equipped with a mechanical overhead stirrer, condenser, addition funnel, and a nitrogen inlet were charged 137 grams oftert-butylbenzene, 92.4 grams of an ethylene-propylene copolymer comprised of about 80 mole percent propylene and about 20 mole percent ethylene, and 7.6 grams of polypropylene. The mixture was heated to 160 degrees C. over 50 minutes to afford a slightly yellow solution. While holding at 160 degrees C., maleic anhydride (8.0 grams) was charged to the reaction flask and 2,5-bis(tert-butylperoxy)-2,5-dimethylhexane (3.2 grams, radical initiator) was charged to the addition funnel. The radical initiator was charged dropwise to the reaction flask over 50 minutes at 165 degrees C. The contents of the flask were stirred for an additional 4.5 hours at 165 degrees C. following the addition of the radical initiator. The tert-butylbenzene was distilled from the reaction mixture under vacuum until nothing else distilled from the pot at a temperature of 173 degrees C. and a pressure of 15 mmHg. The molten modified polyolefin was poured into a wax-coated box and allowed to cool to ambient temperature. Analysis of this material yielded an acid number value of 54.6 mg KOH/gram for the modified polyolefin.

Example #9

To a 1-L, 3-neck round bottom flask equipped with a mechanical overhead stirrer, condenser, two addition funnels, and a nitrogen inlet was charged 274 grams of tert-butylbenzene and 150 grams of an ethylene-propylene copolymer comprised of about 80 mole percent propylene and about 20 mole percent ethylene. The mixture was heated to 150 degrees C. over 1 hour to obtain a colorless solution. While holding at 150 degrees C., dimethyl maleate (17.6 grams) was charged to one of the addition funnels and 2,5-bis (tert-butylperoxy)-2,5-dimethylhexane (4.8 grams, radical initiator) was charged to the other addition funnel. The dimethyl maleate and radical initiator were charged dropwise to the reaction flask over 30 minutes. The contents of the flask were stirred for an additional 4 hours at 150 degrees C. following the addition of the dimethyl maleate and the radical initiator. The contents of the reaction flask (about 436 grams) were transferred to a 3-L 3-neck flask and the temperature of the reaction mixture was adjusted to about 70 degrees C. Acetone (1.25 L) was charged to the flask over 50 minutes to precipitate the modified polyolefin out of solution while keeping the temperature between 60–70 degrees C. The resulting mixture was refluxed for 15 minutes then cooled to 50 degrees C. The acetone was decanted away from the precipitated polymer. Additional acetone (750 mL) was charged to the flask and the mixture was heated to reflux and held for 15 minutes. The mixture was cooled slightly and the acetone was decanted away from the polymer. The polymer was dried in a 55 degrees C. vacuum oven overnight. Analysis of the purified modified polyolefin by Infrared (IR) revealed an ester carbonyl stretch at 1743 cm-1. The presence of the ester carbonyl stretch in the IR confirmed the addition of the dimethyl maleate to the polyolefin.

Example #10

To a 1-L, 3-neck round bottom flask equipped with a mechanical overhead stirrer, condenser, two addition funnels, and a nitrogen inlet was charged 275 grains of tert-butylbenzene and 150.0 grams of an ethylene-propylene copolymer comprised of about 80 mole percent propylene and about 20 mole percent ethylene. The mixture was heated to 150 degrees C. over 45 minutes to afford a colorless solution. While holding at 150 degrees C., maleic anhydride (12.0 grams) was dissolved in acetone (7.2 grams). The maleic anhydride/acetone solution was charged to one of the addition funnels and 2,5-bis (tert-butylperoxy)-2,5-dimethylhexane (4.8 grams, radical initiator) was charged to the other addition funnel. The maleic anhydride/acetone solution and radical initiator were charged concurrently to the reaction flask over 40 minutes. The contents of the flask were stirred for an additional 4 hours at 150 degrees C. following the addition of the maleic anhydride and the radical initiator. The tert-butylbenzene was distilled from the reaction mixture under vacuum until nothing else distilled from the pot at a temperature of 150 degrees C. and a pressure of 50 mmHg. Xylene (478 grams, mixed isomers) was charged to the molten modified polyolefin over 45 minutes while maintaining the temperature between 120–145 degrees C. The resulting solution of the modified polyolefin in xylene was cooled to room temperature and bottled. Analysis of this material yielded an acid number of 14.7 mg KOH/gram with a solids level of 25.0%. Correcting for %-solids, the acid number value increases to 58.8 mg KOH/gram for 100 percent solid material.

Example #11

To a 1-L, 3-neck round bottom flask equipped with a mechanical overhead stirrer, condenser, addition funnel, and a nitrogen inlet was charged 275 grams of tert-butylbenzene and 150.0 grams of an ethylene-propylene copolymer comprised of about 80 mole percent propylene and about 20 mole percent ethylene. The mixture was heated to 150 degrees C. over 45 minutes to afford a colorless solution. While holding at 150 degrees C. maleic anhydride (12.0 grams) was dissolved in acetone (15.0 grams). To the maleic anhydride/acetone solution was charged 2,5-bis(tert-butylperoxy)-2,5-dimethylhexane (4.8 grams, radical initiator). The resulting solution of maleic anhydride/acetone/radical initiator was transferred to the addition funnel and charged to the reaction flask over 40 minutes. The contents of the flask were stirred for an additional 4 hours at 150 degrees C. following the addition of the maleic anhydride and the radical initiator. The tert-butylbenzene was distilled from the reaction mixture under vacuum until nothing else distilled from the pot at a temperature of 150 degrees C. and a pressure of 50 mmHg. Xylene (478 grams, mixed isomers) was charged to the molten modified polyolefin over 20 minutes while maintaining the temperature between 116–145 degrees C. The resulting solution of the modified polyolefin in xylene was cooled to room temperature and bottled. Analysis of this material yielded an acid number of 11.6 mg KOH/gram with a solids level of 25.0%. Correcting for %-solids, the acid number value increases to 46.4 mg KOH/gram for 100 percent solid material.

The invention has been described in detail with particular reference to preferred embodiments thereof, but it will be understood that variations and modifications can be effected within the spirit and scope of the invention.

What is claimed is:

1. A process for the solution modification of a polyolefin comprising the steps of
   a) dissolving a polyolefin selected from the group consisting of polypropylene and a copolymer comprised of propylene and up to but not including 50 mole percent of a co-monomer, in a substituted aromatic solvent which does not contain benzylic hydrogens or in a mixture of said solvents, to form a solution;
   b) adding an unsaturated anhydride, unsaturated acid or unsaturated ester, and a free-radical initiator to the solution formed in a) to form a reaction mixture; and
   c) reacting the reaction mixture for a suitable period of time to produce a modified polyolefin.

2. The process of claim 1, further comprising the step of precipitating the modified polyolefin from the reaction mixture to purify the modified polyolefin.

3. The process of claim 2, wherein the purified modified polyolefin has an acid number of at least about 30 mg KOH/gram of the purified modified polyolefin.

4. The process of claim 1, wherein the solvent is selected from the group consisting of tert-butylbenzene, anisole, biphenyl, diphenyl ether, methyl benzoate and mixtures thereof.

5. The process of claim 4, wherein the solvent is tert-butylbenzene or anisole.

6. The process of claim 1, wherein the reacting step c) is performed at a temperature ranging from about 100 degrees C. to about 260 degrees C.

7. The process of claim 1, further comprising the step of distilling the solvent from the reaction mixture to recover the modified polyolefin.

8. The process of claim 7, further comprising the step of re-dissolving the modified polyolefin in a solvent.

9. The process of claim 1, wherein the unsaturated anhydride, unsaturated acid or unsaturated ester is added in an amount of from about 1 to 20 weight percent based on the weight of the polyolefin.

10. The process of claim 1, wherein the polyolefin is selected from the group consisting of an ethylene-propylene copolymer, a propylene-1-butene copolymer, a propylene-1-hexene copolymer and mixtures thereof.

11. The process of claim 10, wherein the copolymer is an ethylene-propylene copolymer.

12. The process of claim 11, wherein the ethylene-propylene copolymer is comprised of about 80 mole percent propylene and about 20 mole percent ethylene.

13. The process of claim 1, wherein step b) adds an unsaturated anhydride selected from the group consisting of maleic anhydride, citraconic anhydride, itaconic anhydride, glutaconic anhydride, 2,3-dimethylmaleic anhydride and mixtures thereof.

14. The process of claim 1, wherein step b) adds unsaturated acid is selected from the group consisting of maleic acid, fumaric acid, citraconic acid, itaconic acid, mesaconic acid, glutaconic acid, acrylic acid, methacrylic acid, crotonic acid, 2-pentenoic acid, 2-methyl-2-pentenoic acid and mixtures thereof.

15. The process of claim 1, wherein step b) adds unsaturated ester is selected from the group consisting of dimethyl maleate, diethyl maleate, di-n-propyl maleate, diisopropyl maleate, dimethyl fumarate, diethyl fumarate, di-n-propyl fumarate, di-isopropyl maleate, dimethyl itaconate, methyl acrylate, ethyl acrylate, methyl methacrylate, ethyl methacrylate, methyl crotonate, ethyl crotonate and mixtures thereof.

16. The process of claim 1, wherein the radical initiator is selected from the group consisting of an organic peroxide, an azo compound and mixtures thereof.

17. The process of claim 16, wherein the radical initiator is an organic peroxide selected from the group consisting of dibenzoyl peroxide, tert-amylperoxy 2-ethylhexanoate, tert-butylperoxy 2-ethylhexanoate, tert-butylperoxy isobutyrate, tert-butylperoxy isopropyl carbonate, tert-butylperoxy 3,5,5-trimethylhexanoate, 2,5-dimethyl-2,5-di(benzolyperoxy) hexane, tert-butylperoxy acetate, tert-butylperoxy benzoate, n-butyl 4,4-di(tert-butylperoxy)valerate, dicumyl peroxide, tert-butylcumyl peroxide, di(2-tert-butylperoxy isopropyl) benzene, 2,5-dimethyl-2,5-di(tert-butylperoxy)hexane, di(tert-butyl)peroxide, 2,5-dimethyl-2,5-di(tert-butylperoxy)-3-hexyne, tert-butyl hydroperoxide, cumyl hydroperoxide and mixture there of.

18. The process of claim 16, wherein the radical initiator is an azo compound selected from the group consisting of 2,2'-azobisisopropionitirile, 2,2'-azobisisobutyronitrile (AIBN), dimethyl azoisobutyrate, 1,1'-azobis (cyclohexanecarbonitrile), 2,2'-azobis(2-methylpropane) and mixtures thereof.

19. The process of claim 1, wherein the unsaturated acid, unsaturated anhydride or unsaturated ester and the free radical initiator are combined in a solvent prior to addition to the polyolefin.

20. The process of claim 1, wherein the substituted aromatic solvent is added in an amount of from about 50 to 400 weight percent based on the weight of the polyolefin.

21. The process of claim 1, wherein the free-radical initiator is added in an amount of from about 0.1 to 20 weight percent based on the weight of the polyolefin.

* * * * *

UNITED STATES PATENT AND TRADEMARK OFFICE
CERTIFICATE OF CORRECTION

PATENT NO. : 6,262,182 B1
DATED : July 17, 2001
INVENTOR(S) : Robert L. Eagan et al.

It is certified that error appears in the above-identified patent and that said Letters Patent is hereby corrected as shown below:

<u>Title page,</u>
Assignee, change "Eastman Chemical Co., Ltd.," to -- Eastman Chemical Co., --.

<u>Column 14,</u>
Line 19, change "malcate" to -- maleate --.

Signed and Sealed this

Eighteenth Day of June, 2002

*Attest:*

*Attesting Officer*

JAMES E. ROGAN
*Director of the United States Patent and Trademark Office*